US012640979B2

(12) United States Patent
Jagannathan et al.

(10) Patent No.: US 12,640,979 B2
(45) Date of Patent: May 26, 2026

(54) AUTOMATED ALERT RATIONALIZATION SYSTEM TO INCREASE ALERT VALUE THROUGH CORRELATION OF ALERTS

(71) Applicant: INTERNATIONAL BUSINESS MACHINES CORPORATION, Armonk, NY (US)

(72) Inventors: Anupama Jagannathan, Yorktown Heights, NY (US); Karthick Rajamani, Austin, TX (US); Christopher M. Dye, Encinitas, CA (US); Benjamin Luong, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/536,084

(22) Filed: Dec. 11, 2023

(65) Prior Publication Data

US 2025/0193067 A1     Jun. 12, 2025

(51) Int. Cl.
*H04L 41/0631* (2022.01)
*H04L 41/0604* (2022.01)
(52) U.S. Cl.
CPC ........ *H04L 41/065* (2013.01); *H04L 41/0627* (2013.01)
(58) Field of Classification Search
CPC .......................... H04L 41/065; H04L 41/0627; H04L 41/0631
See application file for complete search history.

(56) References Cited

U.S. PATENT DOCUMENTS

| | | | |
|---|---|---|---|
| 10,007,716 B2 | 6/2018 | Tee | |
| 10,346,851 B1 | 7/2019 | Kapoor | |
| 10,447,525 B2 | 10/2019 | Patrich | |
| 10,936,822 B2 | 3/2021 | Ganesan | |
| 11,165,631 B1 | 11/2021 | Chitalia | |
| 2019/0340241 A1* | 11/2019 | Ganesan | G06F 40/247 |
| 2020/0067798 A1 | 2/2020 | Kalia | |
| 2020/0372367 A1* | 11/2020 | Ha | G06N 3/088 |
| 2021/0326744 A1* | 10/2021 | Israel | G06N 5/02 |

FOREIGN PATENT DOCUMENTS

| | | | |
|---|---|---|---|
| CN | 112685247 A | 4/2021 | |
| WO | WO-2021215720 A1 * | 10/2021 | H04L 41/0609 |

OTHER PUBLICATIONS

Taherizadeh, S. et al., "A Semantic Model for Interchangeable Microservices in Cloud Continuum Computing", Information (2021), vol. 12:40, 22 pgs.

(Continued)

*Primary Examiner* — John M Macilwinen
(74) *Attorney, Agent, or Firm* — CHIP LAW GROUP

(57) ABSTRACT

A computer-implemented method for incident management includes determining a plurality of groups of alert categories from an input of a plurality of alerts. A correlation for a pair of alert categories in at least one group from the plurality of groups of alert categories is determined. A cause-effect relationship or a peer relationship in the pair of alert categories is determined. A grouping rule is established based on the determined correlation, the determined cause-effect relationship, or the determined peer relationship.

10 Claims, 4 Drawing Sheets

(56) References Cited

OTHER PUBLICATIONS

Taherizadeh, S. et al., "Monitoring self-adaptive applications within edge computing frameworks: A state-of-the-art review", The Journal of Systems and Software (2018), vol. 136, pp. 19-38.

Corici, M. et al., "Practical Performance Degradation Mitigation Solution using Anomaly Detection for Carrier-Grade Software Networks", 2018 IEEE Conference on Standards for Communications and Networking (CSCN) (2018), 6 pgs.

\* cited by examiner

300

302   DETERMINE A PLURALITY OF GROUPS OF ALERT CATEGORIES

304   DETERMINE CORRELATION BETWEEN THE ALERTS IN A PAIR OF ALERT CATEGORIES IN A SINGLE GROUP

306   DETERMINE CAUSE-EFFECT RELATIONSHIP BETWEEN THE ALERTS IN THE PAIR OF ALERT CATEGORIES

308   DETERMINE PEER CORRELATION BETWEEN THE ALERTS IN A PAIR OF ALERT CATEGORIES

310   ESTABLISH AN ALERT GROUPING RULE

400

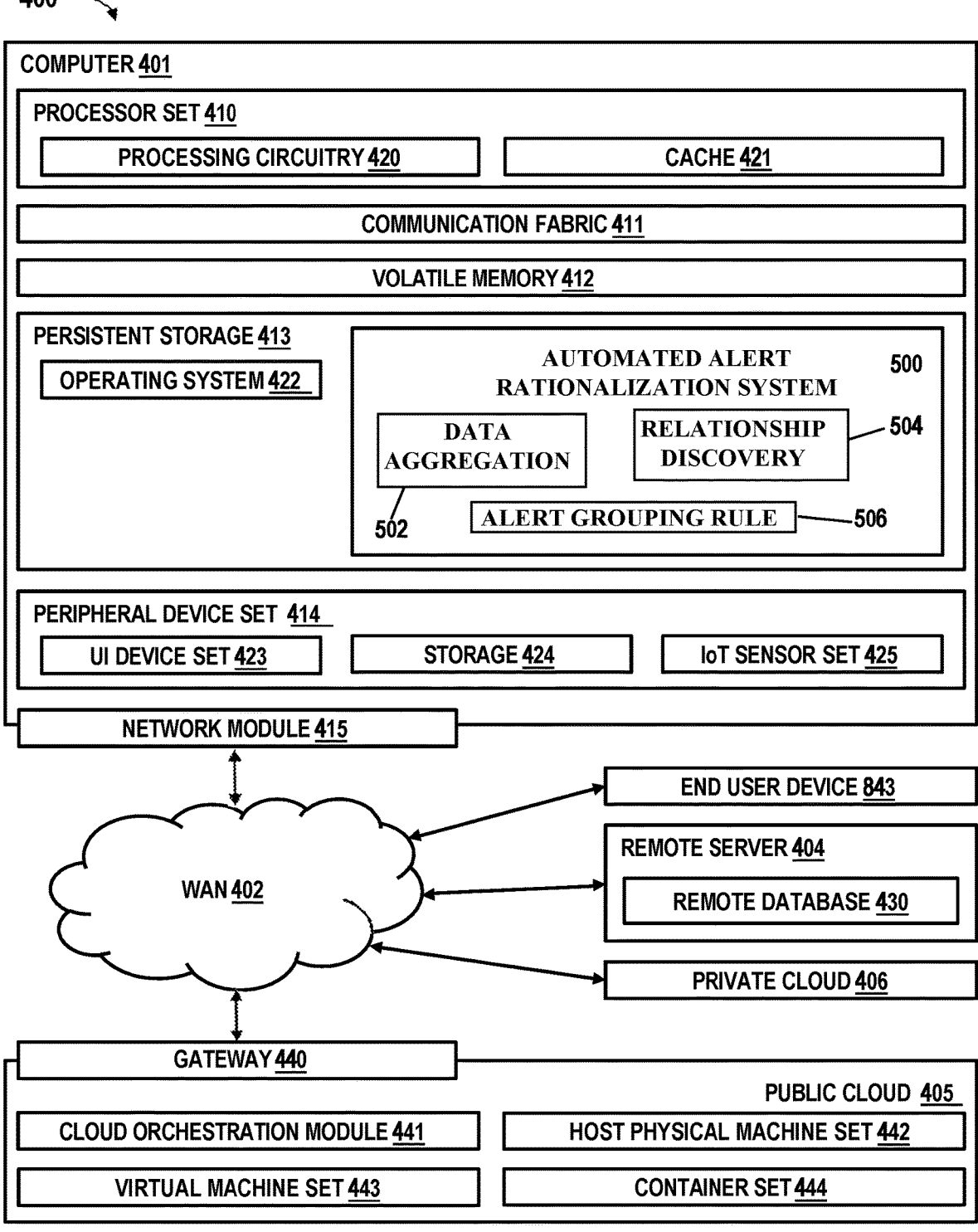

COMPUTER 401

PROCESSOR SET 410

PROCESSING CIRCUITRY 420 CACHE 421

COMMUNICATION FABRIC 411

VOLATILE MEMORY 412

PERSISTENT STORAGE 413

OPERATING SYSTEM 422

AUTOMATED ALERT 500
RATIONALIZATION SYSTEM

DATA AGGREGATION 502

RELATIONSHIP DISCOVERY 504

ALERT GROUPING RULE 506

PERIPHERAL DEVICE SET 414

UI DEVICE SET 423 STORAGE 424 IoT SENSOR SET 425

NETWORK MODULE 415

WAN 402

END USER DEVICE 843

REMOTE SERVER 404

REMOTE DATABASE 430

PRIVATE CLOUD 406

GATEWAY 440

PUBLIC CLOUD 405

CLOUD ORCHESTRATION MODULE 441 HOST PHYSICAL MACHINE SET 442

VIRTUAL MACHINE SET 443 CONTAINER SET 444

FIG. 4

AUTOMATED ALERT RATIONALIZATION SYSTEM TO INCREASE ALERT VALUE THROUGH CORRELATION OF ALERTS

BACKGROUND

The present disclosure generally relates to systems and methods for automated alert rationalization, and more particularly, to an automated alert rationalization system that can increase alert value through correlation of alerts so they can be acted on in an efficient manner as groups of related alerts.

For high availability of tens of thousands of servers, devices, virtual machines, and components in the cloud, real time monitoring of these devices or cloud components is salient. Monitoring tools (e.g., sysdig, zabbix) create alerts when metrics breach a pre-specified threshold for a given amount of time, such as a server's latency is more than 1 second for the past 10 minutes. The hundreds of entities that are monitored to capture golden signals, rate-errors-duration (RED), utilization-saturation-errors (USE) signals, or other signals result in thousands of alert categories. The alerts from monitoring can be informational, low, or low-medium criticality alerts, which are typically found in greater volumes or high-medium or high criticality alerts, which are typically found in lower volumes.

High and high-medium criticality alerts are typically managed as incidents. Incident management software can capture the lifecycle of the alert (as free form text data), including data such as the team responsible for servicing the incident, steps taken to restore the affected entity back into a functioning state.

Existing incident handling approaches are designed for critical and medium critical incidents affecting the cloud/cloud customers and are typically low in volume, use text data around how a cloud impacting incident was resolved, use pre-existing databases to associate groups that alerts could belong, use coincidental (temporal) grouping of incidents regardless of their relatedness towards a common cause, and suppress alerts to avoid alerts volume. These existing approaches result in a lack of consistency in the free text field data, i.e. free text fields may be populated variedly by a human operator, or left blank, leading to less than optimal collection of potentially critical data and subsequent underutilization of the collected data even for incidents of high criticality. In addition to text data, the other types of data captured during incident resolution include observational data, such as text data to indicate the action taken to restore the entity, tar balls containing logs or other data during troubleshooting, images (screen shots) capturing metric trends and anomalies, auto-remediation scripts used or command line interface (CLI) commands executed elsewhere to fix the issues, outputs from the CLI commands; coincidental data, such as server location, microservice cluster, network configuration and time data; and runbooks, containing expert knowledge/view on what action should be taken.

Alerts may be resolved by using, for example, self-healing of the affected components, auto-remediation tools, or execution of runbooks by humans or scripting tools through triage and escalation process involving humans in the loop, depending on the nature of the underlying problem.

SUMMARY

In one embodiment, a system and method are provided that can leverage (instead of suppress) low and medium criticality, high volume alerts as well as the multi-modal incident resolution data to create alerts value by grouping underlying alerts by their relatedness. Methods, according to aspects of the present invention can identify groups of alerts categories using incidents data and alerts data. For each pair of alert categories in a group, methods can determine the correlation using the alerts in the category pair and determine a cause effect or a peer relationship in the alert category pair using individual alerts. The relationship determined can be used to establish a grouping rule for real time alerts' grouping.

The method to group alerts can reduce alert fatigue and increase alert value, resulting in faster mean time to resolve (MTTR); can increase correlation accuracy, resulting in the reduction of false positive correlations and increase of true positive correlations versus generic methods; and can obviate the need to use heuristics. Accordingly, the system and methods according to aspects of the present disclosure provide a substantial improvement to technology and computer functionality.

In one embodiment, a computer implemented method and a computer program product can be configured for incident management includes determining a plurality of groups of alert categories from an input of a plurality of alerts data. A correlation for a pair of alert categories in at least one group from the plurality of groups of alert categories can be realized. A cause-effect relationship or a peer relationship in the pair of alert categories can also be realized. A grouping rule can be established based on the realized correlation, the realized cause-effect relationship, or the realized peer relationship.

In another embodiment, a system includes a processor, a data bus coupled to the processor, a memory coupled to the data bus, and a computer-usable medium embodying a computer program code. The computer program code include instructions executable by the processor. The instructions are configured to determine a plurality of groups of alert categories from an input of a plurality of incidents. A correlation for a pair of alert categories in at least one group from the plurality of group of alert categories can be realized. A cause-effect relationship or a peer relationship in the pair of alert categories can also be realized. A grouping rule can be established based on the realized correlation, the realized cause-effect relationship, or the realized peer relationship.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more efficient illustration. Some embodiments may be practiced with additional components or steps and/or without all the components or steps that are illustrated. When the same numeral appears in different drawings, it refers to the same or like components or steps.

FIG. 4 is a functional block diagram illustration of a computer hardware platform that can be used to implement the method for increasing alert value through correlation of alerts in an automated alert rationalization system, consistent with an illustrative embodiment.

DETAILED DESCRIPTION

Figure 1:
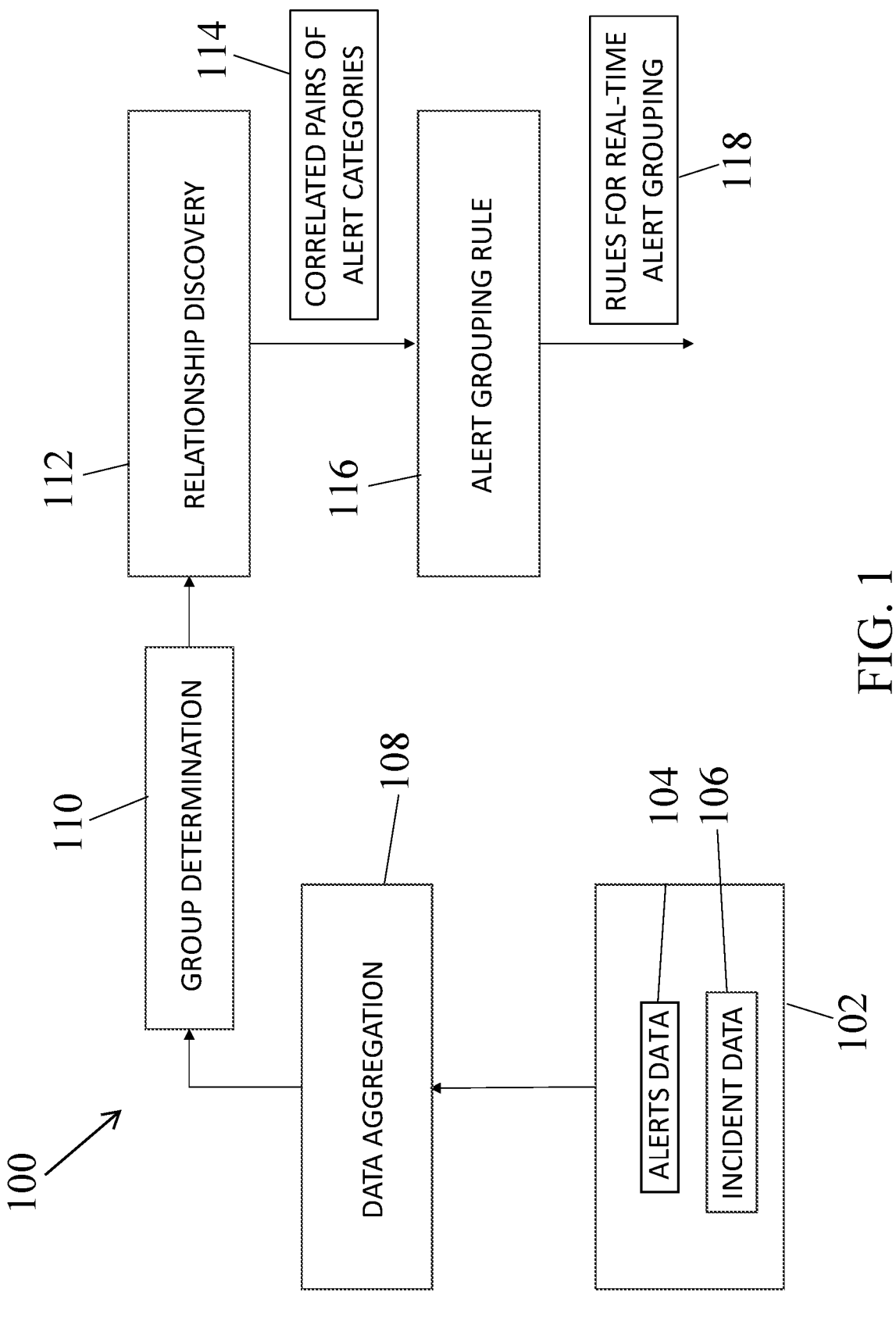
FIG. 1 shows a pictorial representation of a process for increasing alert value through correlation of alerts in an automated alert rationalization system, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

As used herein, the term "entity" is a service, microservice, server, or a cloud resource that needs to be monitored.

As used herein, the term "metric" refers to a numerical quantity that measures the health of an entity at a point in time. A metric is collected at regular intervals herein, such as 1 second intervals or variable time intervals, and represented as time series data.

As used herein, the term "anomalous behavior" refers to having one or more of the following characteristics: a deviation from established behavioral metrics, including but not limited to metrics from network, data storage, compute microservices, systems, and server infrastructure management, the formulation of specific suspicious behavioral patterns, a network policy violation or breaking a set of pre-established rules. Anomalous behavior can be detected using metrics, logs, and/or other monitoring modalities.

As used herein, the term "alert" refers to a notification that a metric (for an entity) has exceeded and stayed above a threshold for a given amount of time and is indicative of a problem. An alert notification may also be generated if it is atypical for an entity to fall below a certain threshold for a given period of time. Such an alert notification includes metadata about the entity and its relationship to the triggered alert such as the location of the entity, trigger time of the alert, the value of the metric when the alert was triggered, as well as the other alert metadata, including but not limited to alert category, alert description, and runbooks, hereafter referred to as alert data.

As used herein, the term "related alerts" refers to those groups of alerts that are triggered for the same or similar problem affecting an entity or a set of entities. Related alerts are typically resolved by a common set of validation and recovery sub-steps.

As used herein, the term "incident" is a notification for an unplanned interruption in operation of an entity or degradation in the quality of service for an entity. Not all alerts become incidents and an incident can be created manually by an operator such as a human user who notices entity failure or entity degradation.

As used herein, the term "incident management system" refers to a system or software used to manage and describe the lifecycle of an incident, indicating the start and end times of the incident, including who should service the incident, what are the steps to resolve the issue that is causing the service disruption or degradation, outputs from those steps, and the like, taken to restore the affected entity back into a functioning state.

As used herein, the term "work notes" refers to documentation of the steps used in troubleshooting and resolution of an incident.

As used herein, the term "runbook" refers to the prescriptive set of steps to be taken by an operator to investigate, troubleshoot, and fix the issue that resulted in the alert. The resolution process typically involves the execution of one or more commands and/or scripts indicated in the runbook, to restore the system to operational condition or functioning state.

As used herein, the term "alert category" refers to the type of alert, where a set of alerts generated by the same trigger condition will have same alert category definition. The alert category, which is a human-readable shorthand explanation for an alert trigger condition, helps a human user to better understand the purpose of an alert and its potential effect, helps prioritized handling of the incident.

As used herein, the term "incident category" refers to the type of incident where a set of incidents generated by the same trigger condition will have same incident category definition.

As used herein, the term "peer relationship" for alerts, refers to alert notifications triggered by a common cause, for entities within a common scope. Scope can include the location of the entity, and/or entities belonging to the same workload.

As used herein, the term "cause-effect" refers to a precedent and antecedent relationship between two alerts, such that it can be established for the pair that the condition that produced the first alert, is the "cause" of the second, related alert. The method of determining the cause-effect relationship is described in detail below.

As used herein, the term "alert rationalization" refers to the process of assessing the corpus of alerts produced in monitoring a system, analyzing the alert data, and the resultant multimodal incident resolution data, to maximize the accuracy, value, and insight obtained from the body of alerts while minimizing alert noise.

As used herein, the term "alert fatigue" refers to a negative effect that a large number of alerts can have on a human operator, requiring excess manual effort to parse, and providing less value per alert than a single alert indicating root cause.

As defined herein, "multimodal incident resolution data" includes the triage data or machine generated data such as image artifacts, status commands and outputs, runbooks, log messages, images of metric trends, compressed files with troubleshooting data, work notes, diagnostic scripts, and runbooks executed, that are used as part of incident resolution.

As described in greater detail below, aspects of the present disclosure provide systems and methods that can leverage (instead of suppress) low and medium criticality high volume alerts as well as the multi-modal incident resolution data to create alerts value by grouping underlying alerts by their relatedness.

According to an aspect of the present disclosure, there is provided a computer-implemented method, a system and a computer program product for incident management, where the method includes determining a plurality of groups of alert categories from an input of a plurality of alerts data. A correlation for a pair of alert categories in at least one group from the plurality of groups of alert categories can be realized. A correlation based on cause-effect relationship or a peer relationship in the pair of alert categories can also be realized. A grouping rule can be established based on the realized correlation, the realized cause-effect relationship, or the realized peer relationship.

In an embodiment, which can be combined with the preceding embodiment, the input can include incident data and alert data.

In an embodiment, which can be combined with one or more of the preceding embodiments, the incident data includes one or more of an alert category, an alert description, runbooks, images of metric trends, compressed files and work notes.

In an embodiment, which can be combined with one or more of the preceding embodiments, the alert data includes alerts from anomalous logs and metrics and includes one or more of alert category, alert description, runbooks, and trigger time of the alert.

In an embodiment, which can be combined with one or more of the preceding embodiments, the correlation for the pair of alert categories in the single group from the plurality of groups of alert categories is determined.

In an embodiment, which can be combined with one or more of the preceding embodiments, correlation includes peer correlation or cause-effect correlation.

In an embodiment, which can be combined with one or more of the preceding embodiments, the method can further include estimating a time window for generating the grouping rule based on a start time of alerts in the pair of alert categories.

In an embodiment, which can be combined with one or more of the preceding embodiments, the estimated time window is a statistic based on the differences in the start time of an alert in the first alert category and the corresponding alert in the second alert category.

In an embodiment, which can be combined with one or more of the preceding embodiments, the method can further include using the grouping rule in real-time an automated alert rationalization system.

Although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

Accordingly, one or more of the methodologies discussed herein may leverage (instead of suppress) low and medium criticality, high volume alerts as well as the multi-modal incident resolution data to create alerts value by grouping underlying alerts by their relatedness. This may have the technical effect of significantly reducing alert fatigue while increasing alert value, resulting in faster mean time to resolve (MTTR); increasing correlation accuracy, resulting in the reduction of false positive correlations and increase of true positive correlations versus generic methods; and obviating the need to use heuristics. Accordingly, the system and methods according to aspects of the present disclosure provide a substantial improvement to technology and computer functionality.

It should be appreciated that aspects of the teachings herein are beyond the capability of a human mind. It should also be appreciated that the various embodiments of the subject disclosure described herein can include information that is impossible to obtain manually such as by a human user. For example, the type, amount, and/or variety of information included in performing the process discussed herein can be more complex than information that could be reasonably be processed manually by a human user.

Referring to FIG. 1, a process flow chart 100 for an automated alert rationalization system is shown. The system can increase alert value through correlation of alerts so they can be acted on in an efficient manner as groups of related alerts. Inputs 102 can be fed to a data aggregation block 108. The inputs 102 can include alerts or incident data. In an embodiment, alerts can include notifications generated from anomalous logs or notifications generated from anomalous metrics and can include alert description, alert category, trigger time or start time of an alert, and runbooks. The incident data can include an incident description, an incident category, multimodal incident resolution data, the start time of the incident, end time of the incident and the like. In some embodiments, the incident category may be a previously known category to describe the type of incident whereas in other embodiments, incident category may be a new, previously unused category to characterize the incident. In some embodiments, the incident data may be provided, completely or partially, from a separate incident management software application.

In the data aggregation block 108, the unstructured data from the inputs 102 is aggregated. For every alert or incident, such an unstructured data can be aggregated through preprocessing on runbooks or compressed data, by meta data extraction from images, from text analysis via pre-processing, stop word removal, corpus creation, or the like, from lemmatization and part of speech (POS) tagging, and the like. In an embodiment, wherein an alert or incident includes images, the text meta data from the image can be extracted through image annotation methods. Such methods that leverage but are not restricted to, machine learning and deep learning techniques can label an image with a phrase or sentence that describes the metrics present in the image, the metric trend captured in the image and the like. In an embodiment where the data present in input 102 is compressed files containing log data, unstructured text may be extracted by uncompressing files, using log parsing methods to extract text of interest. Text data of interest includes but is not restricted to log lines containing errors and warnings. In another embodiment, where the data present in input 102 is compressed files containing CLI outputs from commands executed against the entities in the environment, the unstructured data may be extracted by uncompressing files and extracting CLI output lines containing errors, warnings and the like. In another embodiment, where text data is present in the runbook or worknotes for an incident, text data preprocessing methods including but not limited to stop work removal, POS tagging, lemmatization may be used to compile words, phrases and sentences of interest for the said incident or alert. A corpus of words, phrases and sentences aggregated from a combination of alerts and incidents data present in the block 102 is the output from the data aggregation block 108.

The corpus of words, phrases and sentences are input into the group determination block 110. The group determination block 110 uses the incident identifier, incident category and the associated words, phrases and sentences across the corpus of incidents to determine groups of alert categories using groups of words and phrases or sentences that are semantically similar. In some embodiments, such patterns can be identified by organizing the text data into groups. In some other embodiments, semantically similar groups can be identified through discovery of hidden patterns, using a range of methods including but not limited to natural language processing (NLP) based topic modeling, statistical modeling or deep learning. Every group identified using the group determination block 110 consists of words, phrases, sentences that are semantically similar. A subset of the words, phrases or sentences could appear in more than one group. Membership of words, phrases or sentences in more than one group may result in the grouping of alerts into overlapping groups. In some embodiments the groups can be overlapping, whereas in other embodiments, the groups can be disjoint i.e., there is no overlap or insufficient overlap between any of the identified groups. Where disjoint groups occur, the set of words, phrases and sentences in one disjoint group will be semantically dissimilar compared to the set of words, phrases and sentences in another disjoint group.

The words, phrases or sentences are mapped to the incidents that they were aggregated from. In some embodiments, the words, phrases or sentences are mapped to a single incident. In other embodiments, the words, phrases and sentences are mapped to multiple incidents. A resultant unique set of incident categories or alert categories is extracted. This unique set of alert or incident categories characterize a group. One or more such groups is the output from the group determination block 110. An incident or alert category may be present in exactly one group or in more than one group. The presence of an incident or alert category in multiple groups occurs when the groups are overlapping due to some degree of semantic similarity present in the words, phrases or sentences that make up the groups. The output from block 110 can result in a single group including a single alert category, or multiple groups of alert categories, where each group includes one or more than one alert category.

Figure 2:
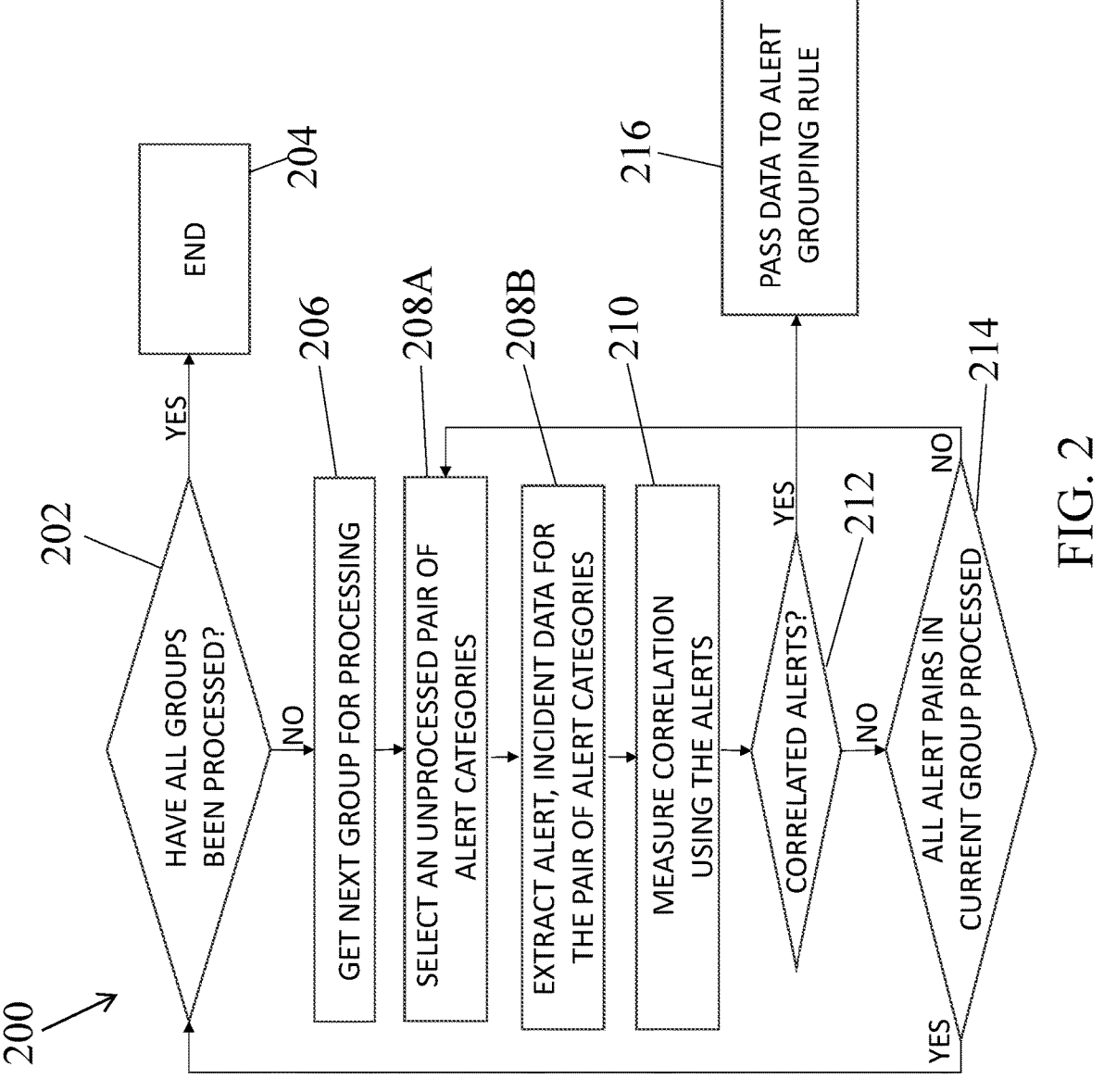
FIG. 2 shows a flow chart illustrating a process of relationship discovery, consistent with an illustrative embodiment.

The one or more groups of alert categories 110 can be provided as input to a relationship discovery block 112. A set of groups, such as N groups, can be provided to the relationship discovery block 112, where each group includes a set of alert categories and associated alerts or incidents for those categories. The groups can be processed according to the flow chart 200 of FIG. 2, for example, where, at decision block 202, it can be determined whether all the groups identified by group determination block 110 have been evaluated. If so, the process ends at block 204. If not, at block 206, the next yet unevaluated group is selected for processing.

At blocks 208A and 208B, for the selected group, a pair of alert categories in the group is selected and alerts or incidents data for the alert category pair such as incident start time, location of the affected entity, entity metadata are extracted. At block 210, a correlation is measured using the aforementioned alerts data or incident data, as discussed in greater detail below.

At decision block 212, it determined whether the alerts are correlated. Correlation is used to establish relationship between alerts or incidents corresponding to different alert categories. Various forms of correlation exist including but not limited to peer correlation or cause effect correlation. A pair of alerts from different alert categories is an exemplar of cause effect correlation, if the first alert identifies the primary symptom or root cause of issue affecting an entity and the second alert which triggers at some time interval after the first alert, is related to the same issue affecting the said entity or may correspond to other entities affected due to issues in the first entity. In order to establish cause-effect correlation for a pair of alert categories, majority of the alert pairs, where one alert in the pair comes from an alert category which is different from the alert category associated with other alert in the pair, must demonstrate cause-effect correlation. A pair of alerts from different alert categories is an exemplar of peer correlation, if first alert identifies the symptom or root cause of issue affecting an entity and the second alert which triggers at some time interval after the first alert or at the same time as the first alert, identifies issues affecting another entity. The two affected entities may be related in a number of ways including that they are running in the same location such as a data center or the affected entities may be part of a larger cloud process or workflow that triggers the functioning of these entities. In order to establish peer correlation for a pair of alert categories, majority of the alert pairs, where one alert in the pair comes from an alert category which is different from the alert category associated with other alert in the pair, must demonstrate peer correlation. In some embodiments, correlation whether cause-effect or peer correlation can be measured using the incident or alert start times without any restrictions on where the alerts occurred or what triggered the alert or incident. In other embodiments, the search space to establish correlation can be restricted to the locations where the alerts are triggered. Such locations can be physical locations such as data centers or clusters or groups of machines. At decision block 212, if the cause/effect relationship and/or the peer relationship is established between the alerts in the alert category pair and the actual set of alerts is fed, at block 216, to the alert grouping rule block 116 of FIG. 1, described below. At decision block 212, if there is determination that there is no correlation between the pair of alert categories, then the process proceeds to block 214 to determine if all alert category pairs in the current group have been evaluated for correlation. If so, the process moved back to decision block 202. If not, the process moves back to block 208.

Referring back to FIG. 1, the correlated pairs of alert categories 114 and the alerts in the said pair of correlated categories can be fed to an alert grouping rule block 116, where, using the relationship determined by the relationship discovery block 112, grouping rules can be established for real-time alert grouping.

In some embodiments, the trigger time difference found in the relationship discovery block 112 can be used to estimate a time window for grouping alerts in the pair of alert categories. For every alert in an alert category pair, the relationship discovery block identifies another alert in the other alert category in the same alert category pair. Using the start times of the said alert pair in the alert category pair, the trigger time difference for the pair of alerts is measured. Trigger time difference is the difference between the start time of the first alert and the start time of the second alert. Trigger time difference is computed for all alert pairs in the alert category pair. For n pairs of alerts in an alert category pair, this results in n trigger time difference values. Using the n trigger time difference values, a time value is selected. This time value, hereafter referred to as estimated time window is used in the alert grouping rule 118 to indicate when a pair of alerts from a pair of alert categories should be grouped. In an embodiment, the estimated time window can be selected by picking the minimum of the n trigger time difference values. In another embodiment, the estimated time window can be selected by picking the median of n trigger time difference values. In another embodiment, statistical methods such as bootstrapping can be applied to determine estimated time window. When the correlated pair of alert categories 114 falls within this estimated time window, a new rule 118 can be generated. When the correlated pair of alert categories 114 falls within this estimated time window, an existing rule can be updated with a new estimated time window value. These rules 118 can be stored for use in real-time in an automated alert rationalization system, thus providing increased alert value through correlation of alerts so they can be acted on in an efficient manner as groups of related alerts.

Example Process

Figure 3:
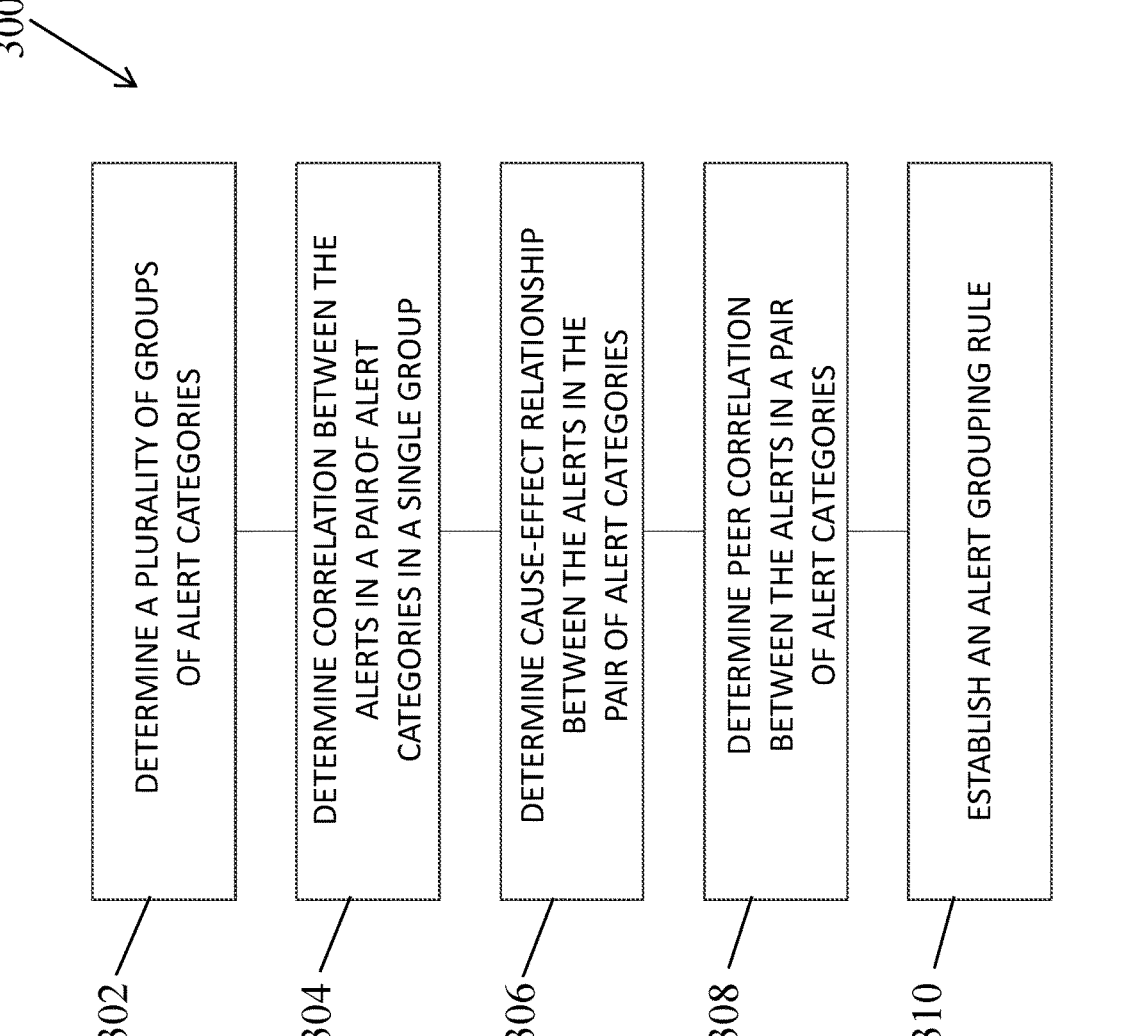
FIG. 3 shows a flow chart illustrating an overall process for increasing alert value through correlation of alerts in an automated alert rationalization system, consistent with an illustrative embodiment.

It may be helpful now to consider a high-level discussion of an example process. To that end, FIG. 3 presents an illustrative process 300 related to the method for incident management. Process 300 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIG. 3, block 302 of process 300, can include an act of determining a plurality of groups of alert categories from an input of a plurality of alert data. At block 304, the process 300 can determine a correlation for a pair of alert categories in at least one group from the plurality of groups of alert categories. At block 306, the process 300 can determine a cause-effect relationship in the pair of alert categories. At block 308, the process 300 can determine a peer relationship in the pair of alert categories. Once either the correlation at block 304, or the relationships at block 306 or 308 are realized, the process 300 can establish a grouping rule based on the determined correlation, the determined cause-effect relationship, or the determined peer relationship.

Example Computing Platform

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 4, computing environment 400 includes an example of an environment for the execution of at least some of the computer code involved in performing the inventive methods, including an automated alert rationalization system block 500, which can include a data aggregation block 502, a relationship discovery bloc 504, and an alert grouping rule block 506. In addition to block 500, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 500, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 500 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in block 500 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "includes" "comprises," "including," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for incident management, the computer-implemented method comprising:

determining a plurality of groups of alert categories from an input of a plurality of unstructured multimodal incident resolution data, alerts data, and start times of alerts associated with the plurality of groups of alert categories;

determining a correlation for a pair of alert categories in at least one group from the plurality of groups of alert categories;

determining a cause-effect relationship or a peer relationship in the pair of alert categories based at least in part on the plurality of unstructured multimodal incident resolution data and the start times of the alerts;

estimating a time window for grouping of alerts in the pair of alert categories, wherein the estimating of the time window is based on a plurality of time differences in a start time of a first alert of the alerts and a start time of a second alert of the alerts, and the estimated time window is one of: a minimum of the plurality of time differences, or a median of the plurality of time differences; and establishing a grouping rule for the alerts in the pair of alert categories based on:

the estimated time window, and the determined correlation that includes the determined cause-effect relationship or the determined peer relationship.

2. The computer-implemented method of claim 1, wherein the input includes incident data that includes one or more of an alert category, an alert description, runbooks, images of metric trends, compressed files, or work notes.

3. The computer-implemented method of claim 1, wherein the alerts data includes:

alerts from anomalous logs and metrics; and one or more of alert category, an alert description, or runbooks.

4. The computer-implemented method of claim 1, further comprising using the grouping rule in real-time in an automated alert rationalization system.

5. A system, comprising:

a processor;

a data bus coupled to the processor;

a memory coupled to the data bus; and a computer-usable medium embodying a computer program code, the computer program code comprising instructions executable by the processor to cause the processor to:

determine a plurality of groups of alert categories from an input of a plurality of unstructured multimodal incident resolution data, alerts data, and start times of alerts associated with the plurality of groups of alert categories;

determine a correlation for a pair of alert categories in at least one group from the plurality of groups of alert categories based at least in part on the plurality of unstructured multimodal incident resolution data and the start times of the alerts;

determine a cause-effect relationship or a peer relationship in the pair of alert categories;

estimate a time window for grouping of alerts in the pair of alert categories, wherein the estimation of the time window is based on a plurality of time differences in a start time of a first alert of the alerts and a start time of a second alert of the alerts, and the estimated time window is one of: a minimum of the plurality of time differences, or a median of the plurality of time differences; and establish a grouping rule for the alerts in the pair of alert categories based on:

the estimated time window, and the determined correlation that includes the determined cause-effect relationship or the determined peer relationship.

6. The system of claim 5, wherein:

the input includes incident data that includes one or more of an alert category, an alert description, runbooks, images of metric trends, compressed files, or work notes;

the alerts data includes alerts from anomalous logs and metrics; and the alerts data further includes one or more of the alert category, the alert description, or the runbooks.

7. The system of claim 5, wherein the instructions further cause the processor to update the grouping rule based on the start times of the alerts in the pair of alert categories.

8. The system of claim 5, wherein the instructions further cause the processor to use the grouping rule in real-time in an automated alert rationalization system.

9. A computer program product for incident management, the computer program product comprising a non-transitory computer readable storage medium having program instructions embodied therewith, the program instructions executable by a computer to cause the computer to:

determine a plurality of groups of alert categories from an input of a plurality of unstructured multimodal incident resolution data, alerts data, and start times of alerts associated with the plurality of groups of alert categories;

determine a correlation for a pair of alert categories in at least one group from the plurality of groups of alert categories based at least in part on the plurality of unstructured multimodal incident resolution data and the start times of the alerts;

determine a cause-effect relationship or a peer relationship in the pair of alert categories;

estimate a time window for grouping of alerts in the pair of alert categories, wherein the estimation of the time window is based on a plurality of time differences in a start time of a first alert of the alerts and a start time of a second alert of the alerts, and the estimated time window is one of: a minimum of the plurality of time differences, or a median of the plurality of time differences; and establish a grouping rule for the alerts in the pair of alert categories based on:

the estimated time window, and the determined correlation that includes the determined cause-effect relationship or the determined peer relationship.

10. The computer program product of claim 9, wherein:

the input includes incident data that includes one or more of an alert category, an alert description, runbooks, images of metric trends, compressed files, or work notes; and the alerts data includes alerts from anomalous logs and metrics; and the alerts data further includes the one or more of the alert category, the alert description, and the runbooks.

* * * * *